US011455809B2

(12) United States Patent
Chen et al.

(10) Patent No.: US 11,455,809 B2
(45) Date of Patent: Sep. 27, 2022

(54) METHOD AND APPARATUS FOR DETERMINING LANE CENTERLINE

(71) Applicant: TENCENT TECHNOLOGY (SHENZHEN) COMPANY LIMITED, Guangdong (CN)

(72) Inventors: Si Chen, Shenzhen (CN); Chao Zeng, Shenzhen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 237 days.

(21) Appl. No.: 16/461,425

(22) PCT Filed: Mar. 15, 2018

(86) PCT No.: PCT/CN2018/079134
§ 371 (c)(1),
(2) Date: May 16, 2019

(87) PCT Pub. No.: WO2018/177131
PCT Pub. Date: Oct. 4, 2018

(65) Prior Publication Data
US 2019/0347493 A1 Nov. 14, 2019

(30) Foreign Application Priority Data
Mar. 31, 2017 (CN) .......................... 201710209738.2

(51) Int. Cl.
*G06V 20/56* (2022.01)
*G06T 7/70* (2017.01)
(Continued)

(52) U.S. Cl.
CPC ........... *G06V 20/588* (2022.01); *G01C 21/26* (2013.01); *G01C 21/38* (2020.08);
(Continued)

(58) Field of Classification Search
CPC .... G06K 9/00798; G01C 21/26; G01C 21/38; G01C 21/3815; G01C 21/32;
(Continued)

(56) References Cited

U.S. PATENT DOCUMENTS 9,031,787 B2    5/2015 Kondo et al.
9,043,088 B2 *  5/2015 Isaji ..................... B62D 15/025
                                              701/41
(Continued)

FOREIGN PATENT DOCUMENTS

CN    202854837 U    4/2013
CN    103177246 A    6/2013
(Continued)

OTHER PUBLICATIONS

Communication dated Apr. 10, 2020, from The State Intellectual Property Office of the P.R. of China in Application No. 201710209738.2.

(Continued)

*Primary Examiner* — Thomas Ingram
*Assistant Examiner* — Omar K Morsy
(74) *Attorney, Agent, or Firm* — Sughrue Mion, PLLC

(57) ABSTRACT

A method and apparatus for determining lane center line are provided. The method may include obtaining a target lane in a first road segment from a database, the first road segment being a road segment having a changed lane quantity, the target lane being an added or subtracted lane, two side lane lines of the target lane being respectively connected to two side lane lines of a first lane at two endpoints of a first end of the target lane, the two side lane lines of the target lane intersecting at an intersection point at a second end of the target lane and the intersection point being connected to a side lane line of a second lane.

17 Claims, 11 Drawing Sheets

(51) Int. Cl.
*G08G 1/16* (2006.01)
*G01C 21/00* (2006.01)
*G08G 1/0968* (2006.01)
*G01C 21/26* (2006.01)

(52) U.S. Cl.
CPC ............ *G01C 21/3815* (2020.08); *G06T 7/70* (2017.01); *G08G 1/0968* (2013.01); *G08G 1/167* (2013.01); *G06T 2207/30256* (2013.01)

(58) Field of Classification Search
CPC .. G01C 21/3819; G08G 1/0968; G08G 1/167; G06T 7/70; G06T 2207/30256
See application file for complete search history.

(56) References Cited

U.S. PATENT DOCUMENTS

| | | | |
|---|---|---|---|
| 9,227,632 | B1 | 1/2016 | Lee |
| 10,369,997 | B2 * | 8/2019 | Igarashi ............... B60W 30/165 |
| 10,688,997 | B2 * | 6/2020 | Habu ................. B60W 50/0097 |
| 2009/0299615 | A1 * | 12/2009 | Denaro ................. B60W 50/14 |
| | | | 701/117 |
| 2010/0312527 | A1 * | 12/2010 | Weiland ..................... B60T 8/17 |
| | | | 703/1 |
| 2012/0130637 | A1 | 5/2012 | Strassenburg-Kleciak |
| 2013/0282277 | A1 * | 10/2013 | Rubin .................... G08G 1/167 |
| | | | 701/517 |
| 2016/0358477 | A1 * | 12/2016 | Ansari ............... G06Q 30/0251 |
| 2020/0225681 | A1 * | 7/2020 | Stein ..................... G05D 1/0088 |

FOREIGN PATENT DOCUMENTS

| | | |
|---|---|---|
| CN | 103827635 A | 5/2014 |
| CN | 103903019 A | 7/2014 |
| CN | 103991449 A | 8/2014 |
| CN | 104442814 A | 3/2015 |
| CN | 104700617 A | 6/2015 |
| CN | 105651295 A | 6/2016 |
| CN | 105667518 A | 6/2016 |
| CN | 105957342 A | 9/2016 |
| CN | 106441312 A | 2/2017 |
| CN | 106546260 A | 3/2017 |
| DE | 102015114465 A1 | 3/2016 |
| JP | 2010-19759 A | 1/2010 |

OTHER PUBLICATIONS

Written Opinion in International Application No. PCT/CN2018/079134, dated May 30, 2018.
International Search Report of PCT/CN2018/079134 dated May 30, 2018 [PCT/ISA/210].

* cited by examiner

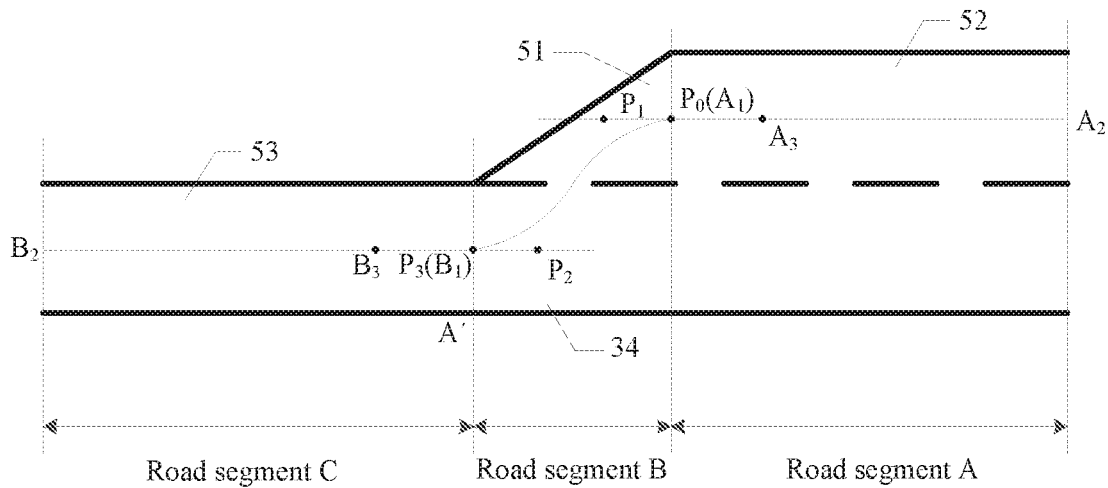

FIG. 5

```
                                                                    601
┌─────────────────────────────────────────────────────────────────┐
│ Obtain, for any non-target lane, at least two groups of         │
│ sampling points on two side lane lines of the non-target lane   │
└─────────────────────────────────────────────────────────────────┘
                                │
                                ▼                                   602
┌─────────────────────────────────────────────────────────────────┐
│ Obtain a midpoint between the first sampling point and the      │
│                    second sampling point                        │
└─────────────────────────────────────────────────────────────────┘
                                │
                                ▼                                   603
┌─────────────────────────────────────────────────────────────────┐
│ Sequentially connect midpoints between the groups of            │
│ sampling points, to obtain the lane center line of the non-     │
│                         target lane                             │
└─────────────────────────────────────────────────────────────────┘
```

FIG. 6

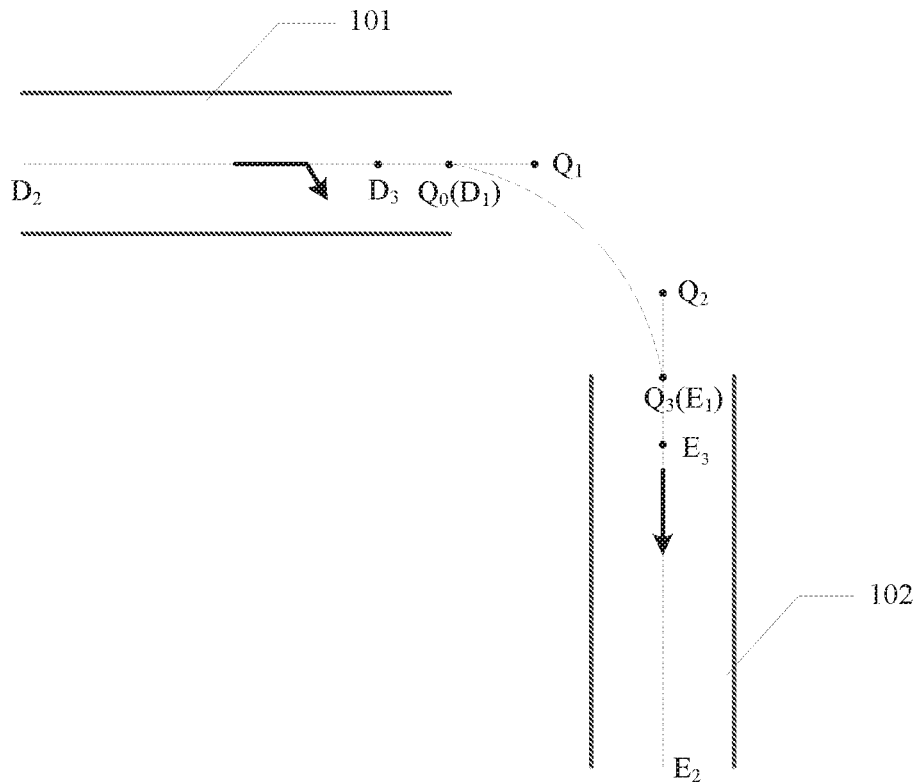

FIG. 11

| A server receives location information sent by user equipment, and obtaining navigation data corresponding to a road segment corresponding to the location information from a database according to the location information, the navigation data including information of a lane center line of a target lane in the road segment; and a quantity of lanes in the road segment being changed, the target lane being an added or subtracted lane, and the lane center line of the target lane in the road segment being determined by the server according to the foregoing method | S1201 |

| Return the navigation data corresponding to the road segment to the user equipment | S1202 |

FIG. 12A

METHOD AND APPARATUS FOR DETERMINING LANE CENTERLINE

CROSS-REFERENCE TO RELATED APPLICATIONS

This application is a U.S. national stage application under 35 U.S.C. § 371 of International Patent Application No. PCT/CN2018/079134 filed on Mar. 15, 2018, which claims priority from Chinese Patent Application No. 201710209738.2, filed in the Chinese Patent Office on Mar. 31, 2017 and entitled "LANE CENTER LINE DETERMINING METHOD AND APPARATUS," the disclosure of which are incorporated herein by reference in their entireties.

BACKGROUND

1. Field

Embodiments of this application relate to the field of intelligent transportation technologies, and in particular, to a method and apparatus for determining a lane center line.

2. Description of Related Art

High-precision maps have been gradually advancing in the field of intelligent transportation technologies including driver assistance and unmanned driving. In a high-precision map, a lane center line having a complete topology connection is important information required by an unmanned driving system. The lane center line may not exist in an actual road, and may not be obtained directly through detection of a sensor.

The lane center line is a characteristic line formed by sequentially connecting center points in a lane width direction from a starting point to an ending point of a lane. The lane center line may reflect a change in the straightness of a road, and may be used as a guide line of a vehicle travelling.

SUMMARY

According to an embodiment, there is provided a lane center line determining method, the method performed by a server, the method including obtaining a target lane in a first road segment from a database, the first road segment being a road segment having a changed lane quantity, the target lane being an added or subtracted lane, two side lane lines of the target lane being respectively connected to two side lane lines of a first lane at two endpoints of a first end of the target lane, the two side lane lines of the target lane intersecting at an intersection point at a second end of the target lane and the intersection point being connected to a side lane line of a second lane. The method also includes obtaining target lane information from the database, the target lane information including locations of the two endpoints of the first end of the target lane, a location of the intersection point at the second end of the target lane, and a location of a lane center point of a neighboring lane of the target lane. The method further includes determining, for the first end of the target lane, a midpoint of the two side lane lines of the target lane at the two endpoints of the first end of the target lane as a center endpoint of the first end of the target lane, determining, for the second end of the target lane, the lane center point of the neighboring lane of the target lane as a center endpoint of the second end of the target lane, the lane center point of the neighboring lane being a midpoint between the intersection point and a mapping point of the intersection point, the intersection point and the mapping point of the intersection point being respectively located on two side lane lines of the neighboring lane, and a connecting line between the intersection point and the mapping point of the intersection point being perpendicular to a travelling direction of the neighboring lane, determining a lane center line of the target lane by using the center endpoint of the first end of the target lane and the center endpoint of the second end of the target lane as two endpoints of the lane center line of the target lane, and storing information of the two endpoints of the determined lane center line and the target lane in the database.

According to another embodiment, there is provided a lane center line determining apparatus including at least one memory configured to store computer program code and at least one a processor configured to access the at least one memory and operate according to the computer program code. The computer program code includes an obtaining code configured to cause the at least one processor to obtain a target lane in a first road segment from a database, the first road segment being a road segment having a changed lane quantity, the target lane being an added or subtracted lane, two side lane lines of the target lane being respectively connected to two side lane lines of a first lane at two endpoints of a first end of the target lane, the two side lane lines of the target lane intersecting at an intersection point at a second end of the target lane and the intersection point being connected to a side lane line of a second lane, and obtain related information of the target lane from the database. The related information may include locations of the two endpoints of the first end of the target lane, a location of the intersection point at the second end of the target lane, and a location of a lane center point of a neighboring lane of the target lane. The apparatus also includes a first determining code configured to cause the at least one processor to determine, for the first end of the target lane, a midpoint of the two side lane lines of the target lane at the two endpoints of the first end of the target lane as a center endpoint of the first end of the target lane, a second determining code configured to cause the at least one processor to determine, for the second end of the target lane, the lane center point of the neighboring lane of the target lane as a center endpoint of the second end of the target lane, the lane center point of the neighboring lane being a midpoint between the intersection point and a mapping point of the intersection point, the intersection point and the mapping point of the intersection point being respectively located on two side lane lines of the neighboring lane, and a connecting line between the intersection point and the mapping point of the intersection point being perpendicular to a travelling direction of the neighboring lane, and a third determining code configured to cause the at least one processor to determine a lane center line of the target lane by using the center endpoint of the first end of the target lane and the center endpoint of the second end of the target lane as two endpoints of the lane center line of the target lane and store information of the two endpoints of the determined lane center line and the target lane in the database.

According to another embodiment, there is provided a lane center line determining method, the method being performed by a server, the method including receiving location information sent by user equipment and obtaining navigation data corresponding to a road segment including the location information from a database, wherein the navigation data comprises information of a lane center line of a target lane in the road segment and a quantity of lanes in the road segment being changed, the target lane being an added or subtracted lane, and the lane center line of the target lane in the road segment being determined by the server, and returning the navigation data corresponding to the road segment to the user equipment.

BRIEF DESCRIPTION OF THE DRAWINGS

FIG. 5 is a schematic diagram of determining a lane center line in a manner of constructing a Bezier curve according to an embodiment.

FIG. 6 is a flowchart of a lane center line determining method according to another embodiment.

FIG. 11 is a schematic diagram of determining a travelling path in a manner of constructing a Bezier curve according to an embodiment.

FIG. 12A is a flowchart of a lane center line determining method according to an embodiment.

DESCRIPTION OF EMBODIMENTS

The following describes in detail implementations of this application with reference to the accompanying drawings.

Some terms related to the embodiments of this application are defined and described herein.

The term "road" may refer to an entire roadway.

The term "lane" may refer to a part of a road in a single column for vehicles to travel. One road includes one or more lanes.

The term "lane line" may refer to a left or right boundary line on either side of a lane.

The term "road segment" may refer to an entire road or a part of a road. One road may be divided into a plurality of road segments along a direction substantially perpendicular to a travelling direction of a vehicle, and the road segments may be successively connected.

The term "intersection" may refer to an end of a road or a place at which roads intersect.

In an embodiment, steps may be performed by a server. For example, the server may include a server cluster including a plurality of servers or a cloud computing service center. In some embodiments, the server may determine a lane center line of each lane by using lane line coordinate data in a high-precision map as an input and the server may determine, by using the lane center line of each lane and lane travelling direction attribute data as an input, a connecting line of the lane center line at an intersection. Further, the server may obtain, through automatic connection and calculation, lane center line coordinate data having a complete topology connection to provide a travelling path for advanced driver assistance or unmanned driving.

Figure 1A:
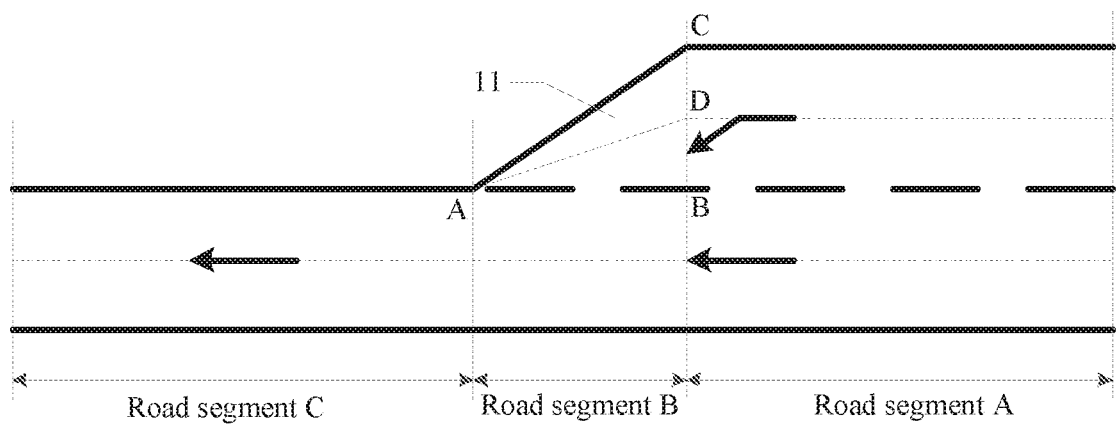
FIG. 1A is a schematic diagram of a road scenario according to an embodiment.

FIG. 1A shows a road scenario according to an embodiment. As shown in FIG. 1A, a geometrical center line of two side lane lines of a lane may be directly used as a lane center line. The lane lines are left and right boundaries of the lane. With reference to FIG. 1A, a travelling direction of the road is from right to left. A lane line of each lane is indicated by a thick solid line or a relatively thick dashed lines in the diagram. For a road segment having an unchanged lane quantity (for example, a road segment A has two lanes and a road segment C has one lane as shown in FIG. 1A), a geometrical center line of two side lane lines of a lane is used as a lane center line. The lane center line is provided to an unmanned driving vehicle, and the unmanned driving vehicle travels along the lane center line. By defining the lane center line and having a vehicle follow the center line, the vehicle may safely travel down the road without straying off from the lane. However, for a road segment having a changed lane quantity (for example, a road segment B shown in FIG. 1A), if a geometrical center line of two side lane lines of a lane is used as a lane center line and provided to an unmanned driving vehicle, and the unmanned driving vehicle travels along the lane center line, a vehicle may not be able to travel within the boundaries of the lane lines or stray off from the lane. Specifically, a vehicle may enter the road segment C from the road segment A by traveling through the road segment B. In the road segment B, a lane quantity is reduced from two to one. A lane 11 in the road segment B is a subtracted lane. Two side lane lines of the lane 11 are AB and AC, a geometrical center line of AB and AC is AD, and D is a midpoint of a line segment BC. If AD is used as a lane center line of the lane 11, when travelling along this lane center line, an unmanned driving vehicle may be in contact with a curbstone at a point A. Moreover, the line AD and a lane center line of the road segment C are not connected, and therefore, the unmanned driving vehicle may not smoothly pull in to the road segment C.

Therefore, for an added or subtracted lane in a road segment having a changed lane quantity, a lane center line determined in the foregoing manner may be inaccurate, and therefore may not be used as a travelling path guide to be provided to an unmanned driving vehicle. Also, if a lane center line is determined in a manual editing manner, a lot of time and effort may be consumed.

Figure 1B:
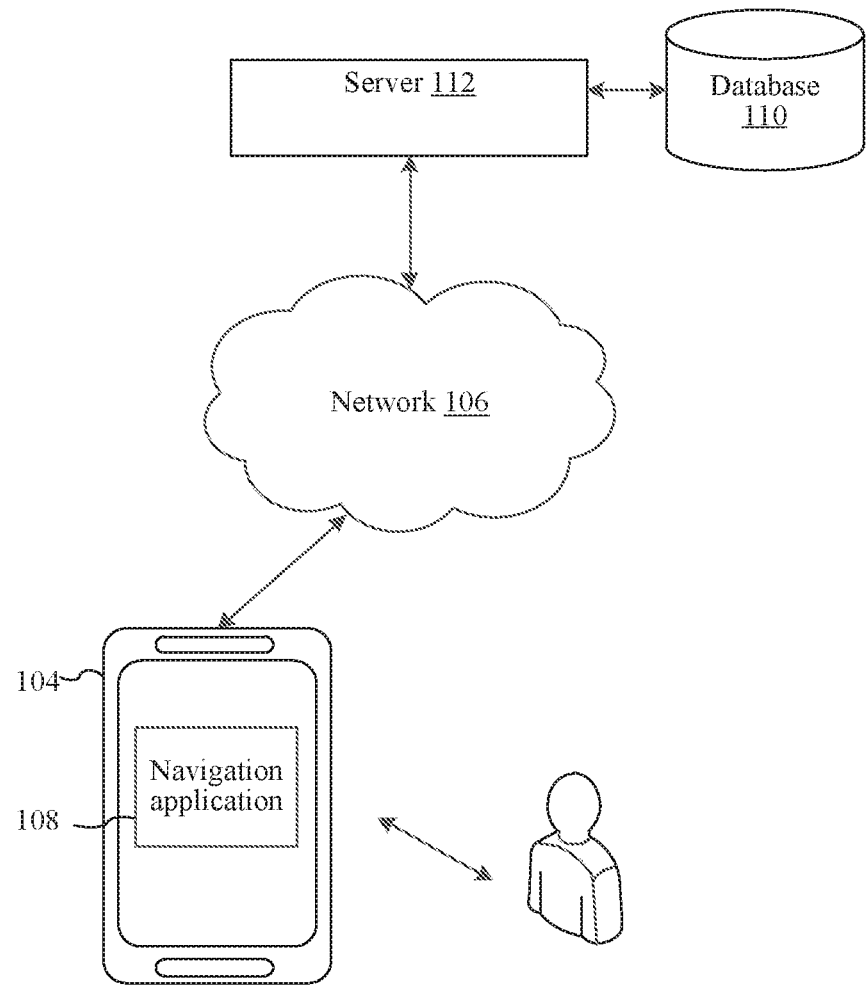
FIG. 1B is a diagram of a network communication of a lane center line determining method according to an embodiment.

FIG. 1B is a schematic diagram of a network communication according to an embodiment. As shown in FIG. 1B, a user equipment 104 of a user may be connected to a server 112 by using a network 106. In some embodiments, the user may be connected to the server 112 by using a navigation application 108 executed on the user equipment 104.

The server 112 maintains a database 110, and the database 110 stores navigation data used to provide a navigation service to the user equipment 104.

The user equipment 104 may include, but is not limited to, a smartphone, a palmtop computer, a wearable computing device, a personal digital assistant (PDA), a tablet computer, a notebook computer, or a combination of any two or more of these data processing devices or other data processing devices.

The network 106 may include a local area network (LAN) and a wide area network (WAN), such as the Internet. The network 106 may be implemented by using any well-known network protocol, including various wired or wireless protocols.

The server 112 may be implemented on one or more independent data processing apparatuses or distributed computer networks.

In some embodiments, the server 112 may obtain, from the database 110, information of a target lane in a first road segment having a changed lane quantity and related information of the target lane. The target lane is an added or subtracted lane. For example, referring to FIG. 1A, two side lane lines of the target lane may be respectively connected to two side lane lines of a first lane at two endpoints of a first end of the target lane. The two side lane lines of the target lane may intersect at an intersection point at a second end of the target lane and the intersection point may be connected to a side lane line of a second lane. The server may include related information including locations of the two endpoints of the first end of the target lane, a location of the intersection point at the second end of the target lane, and a location of a lane center point of a neighboring lane of the target lane. The server 112 determines, for the first end of the target lane, a midpoint of the two side lane lines of the target lane at the two endpoints of the first end of the target lane as a center endpoint of the first end of the target lane. The server 112 determines, for the second end of the target lane, the lane center point of the neighboring lane of the target lane as a center endpoint of the second end of the target lane, the lane center point of the neighboring lane being a midpoint between the intersection point and a mapping point of the intersection point, the intersection point and the mapping point of the intersection point being respectively located on two side lane lines of the neighboring lane, and a connecting line between the intersection point and the mapping point of the intersection point being perpendicular to a travelling direction of the neighboring lane. The server 112 determines the lane center line of the target lane by using the center endpoint of the first end of the target lane and the center endpoint of the second end of the target lane as two endpoints of the lane center line of the target lane, and stores corresponding information of the two endpoints of the determined lane center line and the target lane in the database 110.

Therefore, when the user equipment 104 requests navigation data of the first road segment from the server 112, the server may query the database 110, and send the corresponding navigation data stored in the database 110 to the user equipment 104.

For an added or subtracted lane in a road segment having a changed lane quantity, a lane center line of the lane may be determined by using the solution provided in this embodiment. By accurately determining the lane center line of the changed lane quantity, it can be ensured that the lane center line of the lane and a center line of a neighboring lane connected to the lane are smoothly integrated, thereby improving the accuracy of determining the lane center line. Moreover, according to an embodiment, an automatic computing may be used to improve the efficiency of determining the lane center line by reducing any manual computation.

Figure 2:
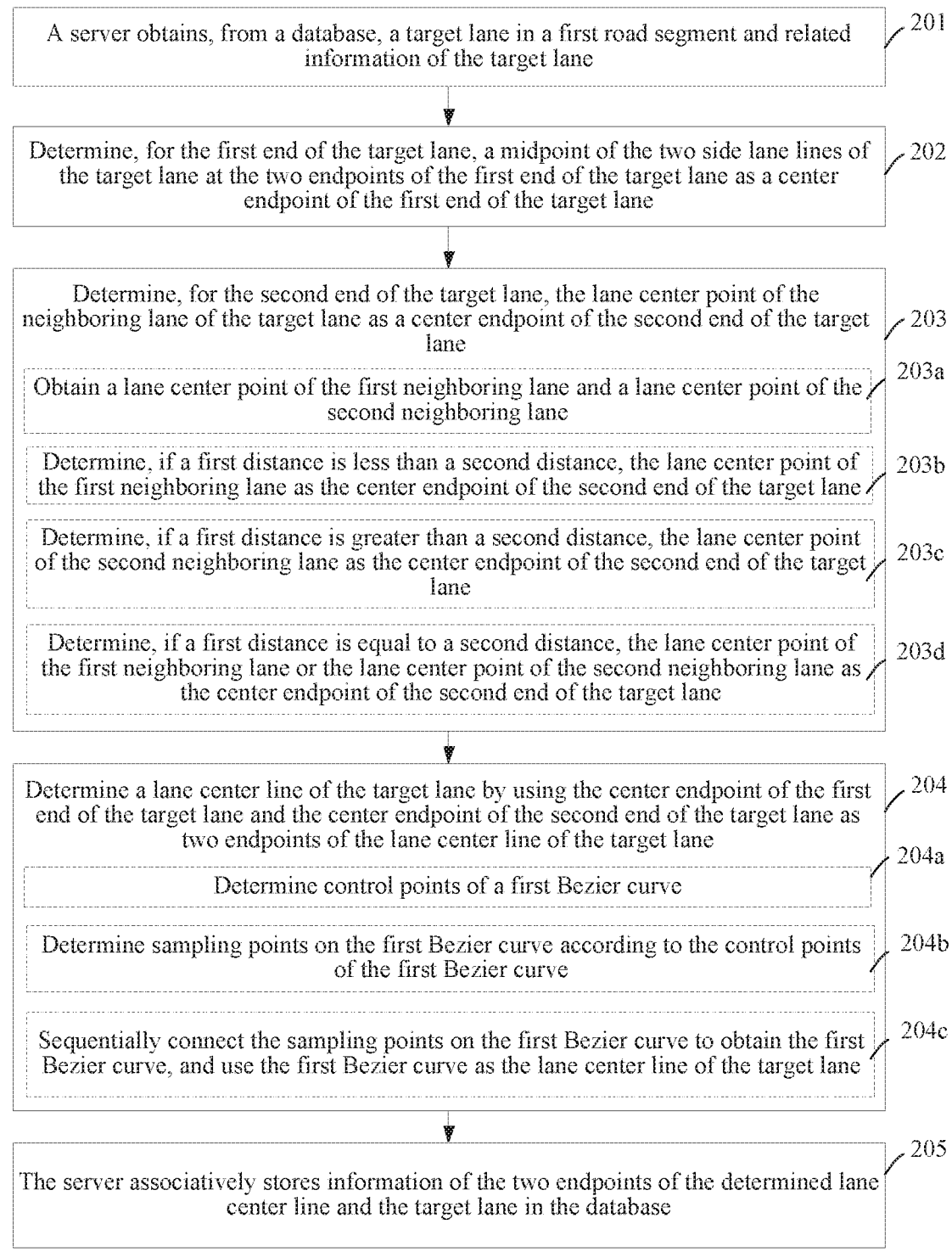
FIG. 2 is a flowchart of a lane center line determining method according to an embodiment.

FIG. 2 is a flowchart of a lane center line determining method according to an embodiment. The method may include the following steps.

In step 201, a server obtains, from a database, a target lane in a first road segment and related information of the target lane.

The first road segment may be a road segment having a changed lane quantity. That is, two side neighboring road segments connected to the first road segment may have different lane quantities. For example, the two side neighboring road segments connected to the first road segment may be a left neighboring road segment and a right neighboring road segment, and a travelling direction is from left to right, That is, a vehicle sequentially passes through the left neighboring road segment, the first road segment and the right neighboring road segment. When the first road segment is a road segment having an increased lane quantity, a quantity of lanes of the left neighboring road segment is less than a quantity of lanes of the right neighboring road segment. Conversely, when the first road segment is a road segment having a reduced lane quantity, a quantity of lanes of the left neighboring road segment is greater than a quantity of lanes of the right neighboring road segment. For example, the left neighboring road segment of the first road segment includes one lane, the right neighboring road segment of the first road segment includes two lanes, and in the first road segment, the lane quantity is increased from one to two. In another example, the left neighboring road segment of the first road segment includes three lanes, the right neighboring road segment of the first road segment includes two lanes, and in the first road segment, the lane quantity is reduced from three to two.

The target lane may be an added or subtracted lane. Two side lane lines of the target lane may be respectively connected to two side lane lines of a first lane at two endpoints of a first end of the target lane, the two side lane lines of the target lane intersect at an intersection point at a second end of the target lane and the intersection point is connected to a side lane line of a second lane.

Figure 3:
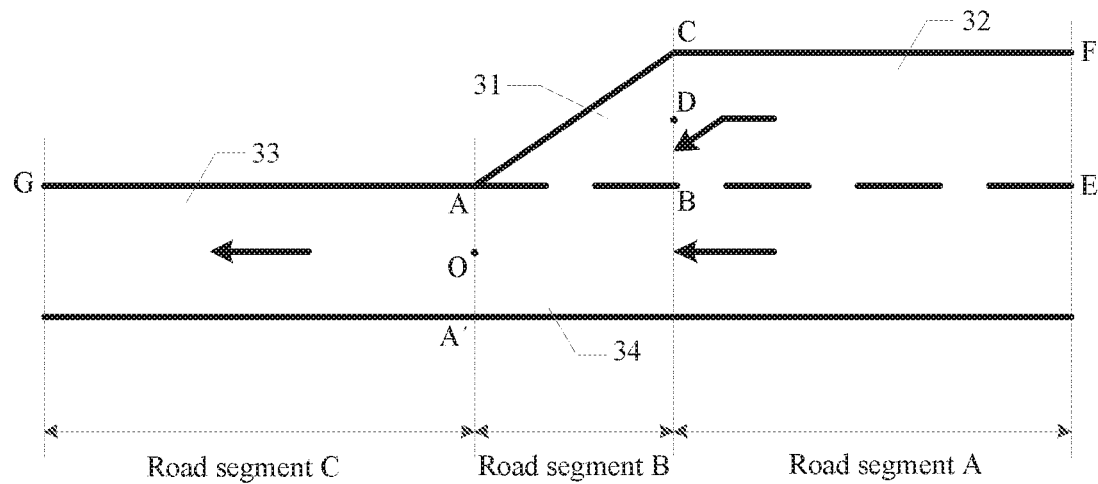
FIG. 3 is a schematic diagram of a road scenario for determining midpoints according to an embodiment.

Referring to a road scenario shown in FIG. 3, a travelling direction of the road is from right to left, and a lane line of each lane is indicated by using a thick solid line or a relatively thick dashed line in the diagram. In FIG. 3, a road segment B belongs to a first road segment (that is, a road segment having a changed lane quantity), and the road segment B includes a target lane 31 (that is, a lane subtracted in the road segment B). Two side lane lines of the target lane 31 are AB and AC. In FIG. 3, a right end of the target lane 31 is a first end of the target lane 31 and a left end of the target lane 31 is a second end of the target lane 31. Two endpoints of the two side lane lines AB and AC of the target lane 31 at the first end of the target lane 31 are respectively a point B and a point C, and the point B and the point C are respectively connected to two side lane lines BE and CF of a first lane 32. The two side lane lines AB and AC of the target lane 31 intersect at a point A at the second end of the target lane 31, and the point A is connected to a side lane line AG of a second lane 33.

According to an embodiment, a lane line may be absent or deficient in the first road segment. For example, the lane line AB may be absent in the road segment B. The server determines that no lane line is absent in the first road segment, the target lane may be determined according to lane lines in the first road segment. However, if a lane line is absent in the first road segment, the lane line absent in the first road segment may be supplemented according to lane lines of two side neighboring road segments connected to the first road segment, and then the server determines the target lane according to the supplemented lane lines in the first road segment.

For example, the lane line absent in the first road segment may be supplemented in the following manner. The server may select, for any first lane line endpoint, a second lane line endpoint at the shortest distance from the first lane line endpoint if a lane line connected to the first lane line endpoint is absent in the first road segment, and connecting the first lane line endpoint to the selected second lane line endpoint to form a lane line. The first lane line endpoint is an endpoint of a lane line in a first neighboring road segment close to the first road segment, the second lane line endpoint is an endpoint of a lane line in a second neighboring road segment close to the first road segment, and a quantity of lanes of the first neighboring road segment may be greater than a quantity of lanes of the second neighboring road segment.

The related information of the target lane may include locations of the two endpoints of the first end of the target lane, a location of the intersection point at the second end of the target lane, and a location of a lane center point of a neighboring lane of the target lane.

In some embodiments, the neighboring lane is a lane that is closest to the target lane and that is located on a left side of the target lane, and/or a lane that is closest to the target lane and that is located on a right side of the target lane, where the lane and the target lane both belong to the first road segment.

In step 202, the server may determine, for the first end of the target lane, a midpoint of the two side lane lines of the target lane at the two endpoints of the first end of the target lane as a center endpoint of the first end of the target lane.

Referring to FIG. 3, a midpoint between the point B and the point C is a point D, and the point D is a center endpoint of the first end of the target lane 31.

In step 203, the server may determine for the second end of the target lane, the lane center point of the neighboring lane of the target lane as a center endpoint of the second end of the target lane.

The lane center point of the neighboring lane is a midpoint between the intersection point (the intersection point of the two side lane lines of the target lane introduced above) and a mapping point of the intersection point. The intersection point and the mapping point of the intersection point are respectively located on two side lane lines of the neighboring lane, and a connecting line between the intersection point and the mapping point of the intersection point is perpendicular to a travelling direction of the neighboring lane.

The neighboring lane of the target lane and the target lane both belong to the first road segment, and the neighboring lane of the target lane may include a lane that is closest to the target lane and that is located on a left side of the target lane, and/or a lane that is closest to the target lane and that is located on a right side of the target lane.

Referring to FIG. 3, a neighboring lane of the target lane 31 is a lane 34. A travelling direction of the neighboring lane 34 is from right to left. A mapping point of the point A is a point A', a midpoint between the point A and the point A' is a point O, and the point O is a center endpoint of the second end of the target lane 31.

There may be one or two neighboring lanes of the target lane. When there is only one neighboring lane of the target lane, a lane center point of the neighboring lane is the center endpoint of the second end of the target lane. When there are two neighboring lanes of the target lane, the center endpoint of the second end of the target lane may be determined in the following manner.

For example, when the neighboring lanes of the target lane include two neighboring lanes in total, a first neighboring lane and a second neighboring lane, the step 203 may further include the following substeps.

In step 203a, the server may obtain a lane center point of the first neighboring lane and a lane center point of the second neighboring lane.

The server then determines a first distance and a second distance. The first distance is a distance between the center endpoint of the first end of the target lane and the lane center point of the first neighboring lane, and the second distance is a distance between the center endpoint of the first end of the target lane and the lane center point of the second neighboring lane.

In step 203b, if the first distance is less than the second distance, the server may set the lane center point of the first neighboring lane as the center endpoint of the second end of the target lane.

In step 203c, if a first distance is greater than a second distance, the server may set the lane center point of the second neighboring lane as the center endpoint of the second end of the target lane.

In step 203d, if a first distance is equal to a second distance, the server may set the lane center point of the first neighboring lane or the lane center point of the second neighboring lane as the center endpoint of the second end of the target lane.

Figure 4:
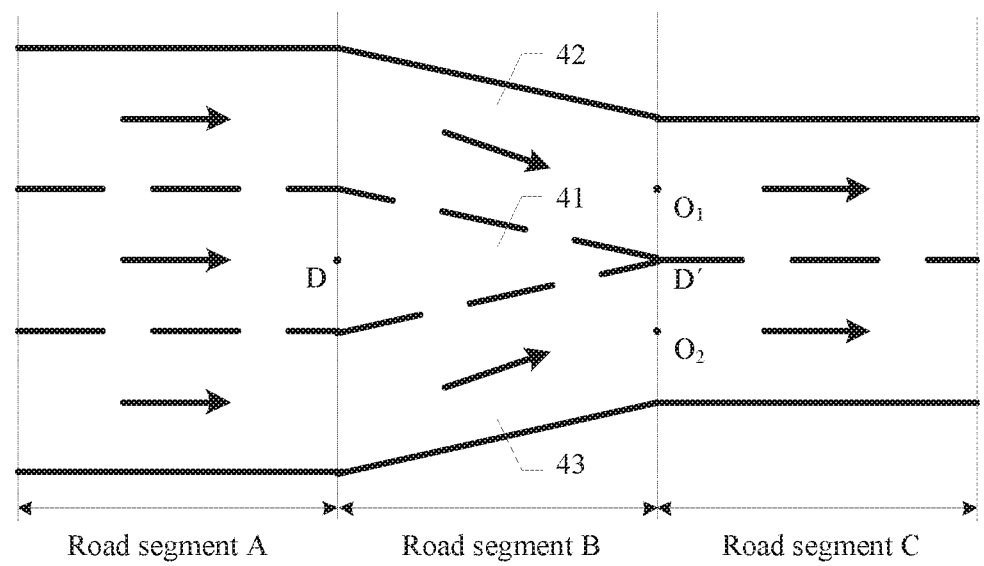
FIG. 4 is a schematic diagram of another road scenario for determining midpoints according to an embodiment.

Referring to a road shown in FIG. 4, a travelling direction of the road is from left to right, and a lane line of each lane is indicated by a solid line or a relatively thick dashed line in the diagram. In FIG. 4, a road segment B belongs to a first road segment (that is, a road segment having a changed lane quantity) and includes a target lane 41 (that is, a lane subtracted in the road segment B). The target lane 41 includes two neighboring lanes, namely, a neighboring lane 42 and a neighboring lane 43 as shown in FIG. 4. A lane center point of the neighboring lane 42 is point O1, a lane center point of the neighboring lane 43 is point O2, and a center endpoint of a first end of the target lane 41 is point D. Therefore, a first distance is a distance between the point D and the point O1, and a second distance is a distance between the point D and the point O2.

For example, the first distance and the second distance may be determined by using the following exemplary implementations.

In a first exemplary implementation, the first distance is calculated directly according to a coordinate of the center endpoint of the first end of the target lane and a coordinate of the lane center point of the first neighboring lane. The second distance is calculated directly according to the coordinate of the center endpoint of the first end of the target lane and a coordinate of the lane center point of the second neighboring lane.

In a second exemplary implementation, a vertical point of the center endpoint of the first end of the target lane on a connecting line between the lane center point of the first neighboring lane and the lane center point of the second neighboring lane may be obtained. A third distance between the vertical point and the lane center point of the first neighboring lane, and a fourth distance between the vertical point and the lane center point of the second neighboring lane may be respectively obtained. If the third distance is less than the fourth distance, it may be determined that the first distance is less than the second distance. If the third distance is greater than the fourth distance, it may be determined that the first distance is greater than the second distance. If the third distance is equal to the fourth distance, it may be determined that the first distance is equal to the second distance. For example, with reference to FIG. 4, it may be assumed that a vertical point of the point D on a line segment O1O2 is D'. If $|D'O_1|<|D'O_2|$, $|DO_1|<|DO_2|$; if $|D'O_1|>|D'O_2|$, $|DO_1|>|DO_2|$; or if $|D'O_1|=|D'_2O|$, $|DO_1|=|DO_2|$. The foregoing symbol || indicates a distance between two points.

In a third exemplary implementation, a sampling point may be obtained on the lane center line of the first lane. An intersection point between an extension line of a connecting line between the sampling point and the center endpoint of the first end of the target lane and the connecting line between the lane center point of the first neighboring lane and the lane center point of the second neighboring lane may be obtained. A fifth distance between the intersection point and the lane center point of the first neighboring lane, and a sixth distance between the intersection point and the lane center point of the second neighboring lane may be respectively obtained. If the fifth distance is less than the sixth distance, it may be determined that the first distance is less than the second distance. If the fifth distance is greater than the sixth distance, it may be determined that the first distance is greater than the second distance. If the fifth distance is equal to the sixth distance, it may be determined that the first distance is equal to the second distance.

It should be noted that, in this embodiment, a travelling direction of a neighboring lane of the target lane is an entire travelling direction of an entire lane to which the neighboring lane belongs. For example, the travelling direction of the neighboring lane 34 of the target lane 31 in FIG. 3 is from right to left, and the travelling direction of the neighboring lanes 42 and 43 of the target lane 41 in FIG. 4 is from left to right.

In step 204, the server may determine a lane center line of the target lane by using the center endpoint of the first end of the target lane and the center endpoint of the second end of the target lane as two endpoints of the lane center line of the target lane.

In another implementation, a straight line connecting the center endpoint of the first end of the target lane to the center endpoint of the second end of the target lane may be used as the lane center line of the target lane.

In another exemplary implementation, a curve connecting the center endpoint of the first end of the target lane to the center endpoint of the second end of the target lane may be used as the lane center line of the target lane.

For example, the lane center line of the target lane may be determined by constructing a Bezier curve. The step 204 may further include the following substeps.

In step 204a, the server may determine control points of a first Bezier curve.

The control points of the first Bezier curve may include P0, P1, P2 and P3. Here, P0 is the center endpoint of the first end of the target lane and P3 is the center endpoint of the second end of the target lane. A coordinate of P1 is $$P_1 = A_1 + k_1(A_1 - A_3)\frac{|A_1 B_1|}{|A_1 A_3|},$$

and a coordinate of P2 is $$P_2 = B_1 + k_1(B_1 - B_3)\frac{|A_1 B_1|}{|B_1 B_3|}.$$

$A_1$ coincides with P0, and $A_3$ may be located on the lane center line $A_1A_2$ of the first lane. For example, $A_3$ may be a sampling point being closest to $A_1$ on the lane center line $A_1A_2$ of the first lane. $B_1$ coincides with P3, and $B_3$ may be located on the lane center line $B_1B_2$ of the second lane. For example, $B_3$ may be a sampling point being closest to $B_1$ on the lane center line $B_1B_2$ of the second lane. $|A_1B_1|$ indicates the length of the line segment $A_1B_1$, $|A_1A_3|$ indicates the length of the line segment $A_1A_3$, $|B_1B_3|$ indicates the length of the line segment $B_1B_3$, where k1 is a preset constant. A value of k1 may be obtained according to practical experience. For example, the value of k1 may range from 0.2 to 0.7.

In step 204b, the server may determine sampling points on the first Bezier curve according to the control points of the first Bezier curve.

A coordinate Ci of an ith sampling point on the first Bezier curve is:

$$C_i = P_0 t^3 + 3P_1 t^2(1-t) + 3P_2 t(1-t)^2 + P_3(1-t)^3,$$

where $$t = \frac{i-1}{n-1},$$

n indicates a quantity of the sampling points on the first Bezier curve, n is an integer greater than 1, $1 \le i \le n$ and i is an integer.

In step 204c, the server may sequentially connect the sampling points on the first Bezier curve to obtain the first Bezier curve, and use the first Bezier curve as the lane center line of the target lane.

FIG. 5 is a schematic diagram of determining a lane center line of a target lane 51 in a manner of constructing a Bezier curve. A center endpoint of a first end of the target lane 51 is P0, and a center endpoint of a second end of the target lane 51 is P3. A lane center line of a first lane 52 is A1A2, A1 is an endpoint being on the lane center line of the first lane 52 and being connected to the first end of the target lane, and A3 is a sampling point close to A1. A lane center line of a second lane 53 is B1B2. B1 is an endpoint being on the lane center line of the second lane 53 and being connected to the second end of the target lane, and B3 is a sampling point close to B1. For the foregoing descriptions about a manner of determining lane center lines of the first lane and the second lane and a related sampling point, refer to the following embodiment of determining a lane center line of a non-target lane. For example, a control point P0 may coincide with A1, and a control point P3 may coincide with B1. Accordingly, it may be ensured that lane center lines of the target lane and a lane connected to the target lane are connected. A control point P1 may be located on an extension line of A3A1, and a control point P2 may be located on an extension line of B3B1. After four control points of the first Bezier curve are determined, a cubic formula for a Bezier curve introduced in step 204b may be used. Subsequently, the coordinates of sampling points on the first Bezier curve may be calculated, and then the sampling points may be connected to obtain the first Bezier curve, which may be shown by using a curve P0P3 in FIG. 5. The curve P0P3 is the lane center line of the target lane 51.

The lane center line of the target lane may be determined by constructing a Bezier curve, so that a curvature of a joint between the target lane and a lane center line of a neighboring road segment of the target lane may be smooth and continuous. This allows a vehicle to travel more smoothly by following the smooth and continuous Bezier curve.

According to this embodiment, a lane center line of the target lane may be determined by constructing a Bezier curve. In another embodiment, the lane center line of the target lane may be further determined in a manner of constructing a spline curve, and a curvature continuity objective may be similarly achieved.

In this embodiment, an order of performing step 202 and step 203 is not limited. For example, the step 202 may be performed before step 203 or may be performed after step 203, or step 202 and step 203 are performed simultaneously.

In step 205, the server associatively stores information of the two endpoints of the determined lane center line and the target lane into the database.

Accordingly, for an added or subtracted lane in a road segment having a changed lane quantity, a lane center line of the lane may be determined by using the solution provided in this embodiment, and it can be ensured that lane center lines of the lane and a lane connected to the lane are smooth and continuous. As such, the method disclosed hereinabove improves the accuracy of determining the lane center line. Moreover, in the solution provided in this embodiment, an automatic computing may be used at all time so that manual intervention is not required, thereby also improving the efficiency of determining the lane center line.

A manner of determining a lane center line of a non-target lane is introduced and described below. The non-target lane may include lanes other than the target lane in the first road segment and any lane in a second road segment, in which second road segment is a road segment having an unchanged lane quantity. The server may use, for any non-target lane, a center line of two side lane lines of the non-target lane as a lane center line of the non-target lane.

For example, as shown in FIG. 6, a lane center line of a non-target lane may be determined by using the following steps.

In step 601, the server may obtain, for any non-target lane, at least two groups of sampling points on two side lane lines of the non-target lane.

Each group of sampling points may include a first sampling point and a second sampling point, where each of the first sampling point and the second sampling point may be located on one lane line of the non-target lane. A connecting line between the first sampling point and the second sampling point may be perpendicular to a travelling direction of the non-target lane.

In step 602, the server may obtain a midpoint between the first sampling point and the second sampling point.

In step 603, the server may sequentially connect midpoints between the groups of sampling points to obtain the lane center line of the non-target lane.

For example, the first sampling point may be a sampling point $Li$ on a left lane line of the non-target lane and the second sampling point may be a sampling point $Ri$ on a right lane line of the non-target lane. A connecting line between the first sampling point $Li$ and the second sampling point $Ri$ may be perpendicular to the travelling direction of the non-target lane, where i is a positive integer. A midpoint $Ci$ between the first sampling point $Li$ and the second sampling point $Ri$ may be calculated by using the following formulas:

$Ci(x)=(Li(x)+Ri(x))/2$ $Ci(y)=(Li(y)+Ri(y))/2;$ $Ci(z)Li(z)+Ri(z))/2.$ $Ci(x)$, $Ci(y)$ and $Ci(z)$ are midpoints in an x-axis coordinate, a y-axis coordinate and a z-axis coordinate, respectively, and $Li(x)$, $Li(y)$ and $Li(z)$ are first sampling points in an x-axis coordinate, a y-axis coordinate and a z-axis coordinate, respectively, and $Ri(x)$, $Ri(y)$ and $Ri(z)$ are second sampling points in an x-axis coordinate, a y-axis coordinate and a z-axis coordinate, respectively. The midpoint $Ci$, the first sampling point $Li$ and the second sampling point $Ri$ are located on the same coordinate system. The foregoing embodiment may be represented in a formula as: $Ci=(Li+Ri)/2$.

After obtaining the midpoint $Ci$ between the first sampling point $Li$ and the second sampling point $Ri$, the server may sequentially connect all midpoints $Ci$ to obtain the lane center line of the non-target lane.

Figure 7:
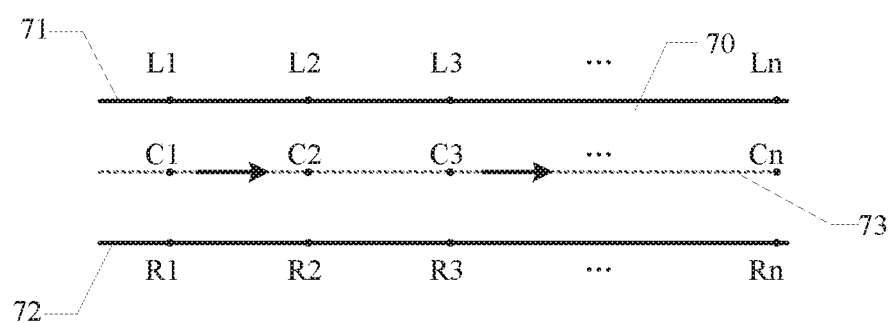
FIG. 7 is a schematic diagram of determining a lane center line of a non-target lane according to an embodiment.

FIG. 7 is a schematic diagram of determining a lane center line of a non-target lane. A travelling direction of the non-target lane 70 is from left to right. The non-target lane 70 includes a left lane line 71 and a right lane line 72, sampling points L1, L2, . . . , and Ln reside on the left lane line 71, sampling points R1, R2, . . . , and Rn reside on the right lane line 72, and the server obtains midpoints C1, C2, . . . , and Cn between groups of sampling points, and sequentially connects the midpoints to obtain a lane center line 73 of the non-target lane 70.

The lane center line of the non-target lane may be determined in the foregoing manner in which the implementation is simple and the calculation amount is small.

Figure 8:
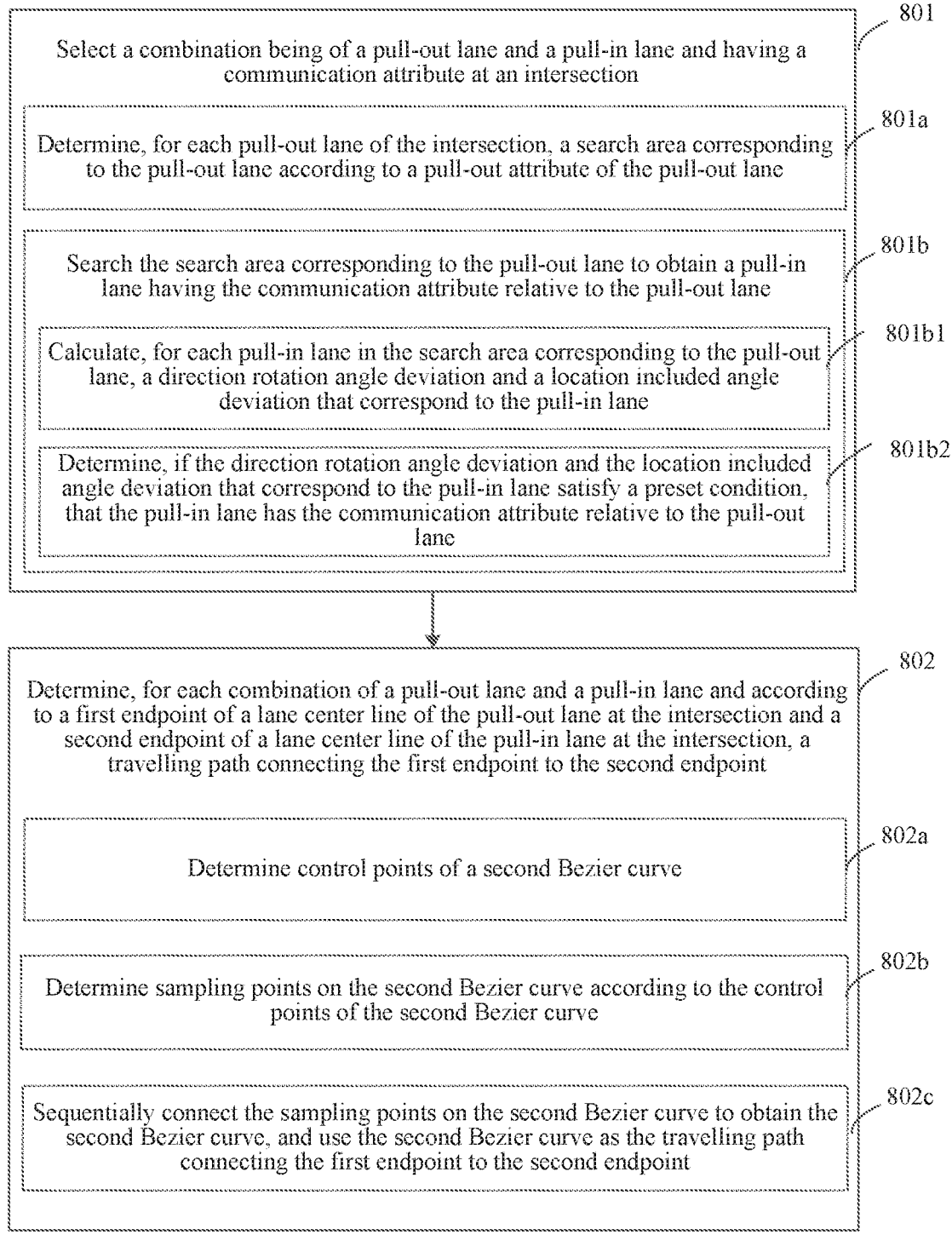
FIG. 8 is a flowchart of a connection method for a lane center line at an intersection according to an embodiment.

A connection method for a lane center line at an intersection is described below by using an embodiment shown in FIG. 8.

In step 801, the server may select a combination of a pull-out lane and a pull-in lane and a communication attribute at an intersection.

The communication attribute may be an attribute that a vehicle pulls into the intersection from the pull-out lane and enters the pull-in lane through the intersection. The pull-out lane may be a lane through which the vehicle pulls in to the intersection, and the pull-in lane may be a lane to which the vehicle pulls in from the intersection. The server may determine, according to lane information stored in a high-precision map, whether a lane is a pull-out lane or a pull-in lane.

In some embodiments, step 801 may include the following substeps.

In step 801$a$, the server may determine, for each pull-out lane of the intersection, a search area corresponding to the pull-out lane according to a pull-out attribute of the pull-out lane.

The pull-out attribute may include at least one of turning right, turning left, going straight, and making a U-turn. The server may obtain the pull-out attribute of the pull-out lane according to the lane information (for example, lane travelling direction attribute data) stored in the high-precision map.

When the pull-out attribute of the pull-out lane differs, the search area corresponding to the pull-out lane determined by the server may also differ.

For example, it may be determined, if a pull-out attribute of a pull-out lane includes turning right, that a first rectangular area G1H1I1J1 may be a search area corresponding to the pull-out lane, where G1 may coincide with a first endpoint, the first endpoint being an endpoint of a lane center line of the pull-out lane at an intersection. H1 may be located on an extension line of the lane center line of the pull-out lane at the intersection, and I1J1 may be parallel to G1H1 and may be located on a side of a right turning direction of G1H1, as shown in a part (a) in FIG. 9.

In another example, it may be determined, if a pull-out attribute of a pull-out lane includes turning left, that a second rectangular area G2H2I2J2 may be a search area corresponding to the pull-out lane, where G2 may coincide with a first endpoint. H2 may be located on an extension line of a lane center line of the pull-out lane at an intersection, and I2J2 may be parallel to G2H2 and may be located on a side of a left turning direction of G2H2, as shown in a part (b) in FIG. 9.

Figure 9:
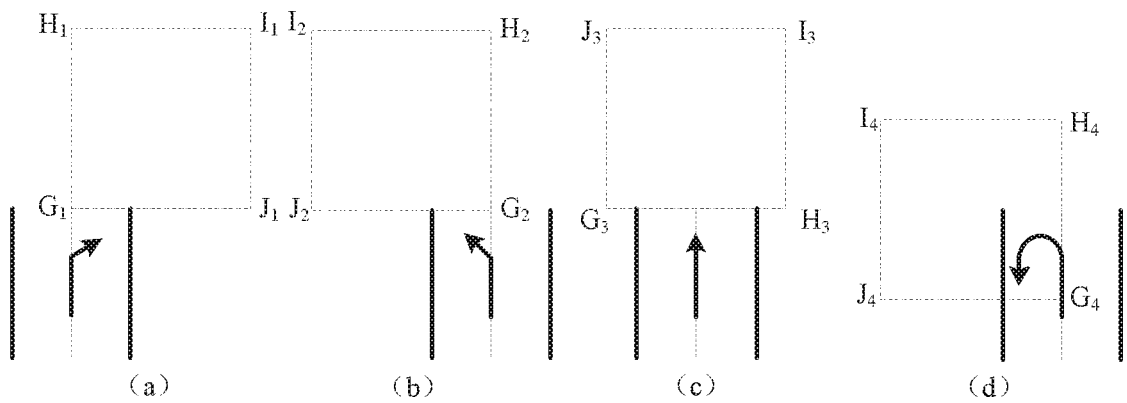
FIG. 9 is a schematic diagram of a search area according to an embodiment.

In another example, it may be determined, if a pull-out attribute of a pull-out lane includes going straight, that a third rectangular area G3H3I3J3 may be a search area corresponding to the pull-out lane, where the first endpoint may be a midpoint of G3H3, and I3J3 may be parallel to G3H3 and may be located on a side of a straight going direction of G3H3, as shown in a part (c) in FIG. 9.

As yet another example, it may be determined, if a pull-out attribute of a pull-out lane includes making a U-turn, that a fourth rectangular area G4H4I4J4 may be the search area corresponding to the pull-out lane, where the first endpoint may be a midpoint of G4H4, and I4J4 may be parallel to G4H4 and may be located on a side of a turning left direction of G4H4, as shown in a part (d) in FIG. 9.

The side length of each of the foregoing search areas may be determined according to an empirical value or the area of the intersection. In some embodiments, each of the foregoing search areas may be a square area, and a value of the side length L of the square area may be obtained according to experimental data. For example, the value of L may range from 10 meters to 100 meters.

In step 801b, the server may search the search area corresponding to the pull-out lane to obtain a pull-in lane having the communication attribute relative to the pull-out lane.

The server may search the search area corresponding to the pull-out lane to obtain one or more pull-in lanes having the communication attribute relative to the pull-out lane.

In some embodiments, the step 801b may further include the following two substeps.

In step 801b1, the server may calculate, for each pull-in lane in the search area corresponding to the pull-out lane, a direction rotation angle deviation and a location including angle deviation that correspond to the pull-in lane.

The direction rotation angle deviation may be an absolute value of a difference between a direction rotation angle and an ideal direction rotation angle. The location including angle deviation may be an absolute value of a difference between a location including the angle deviation and an ideal location included angle.

Figure 10:
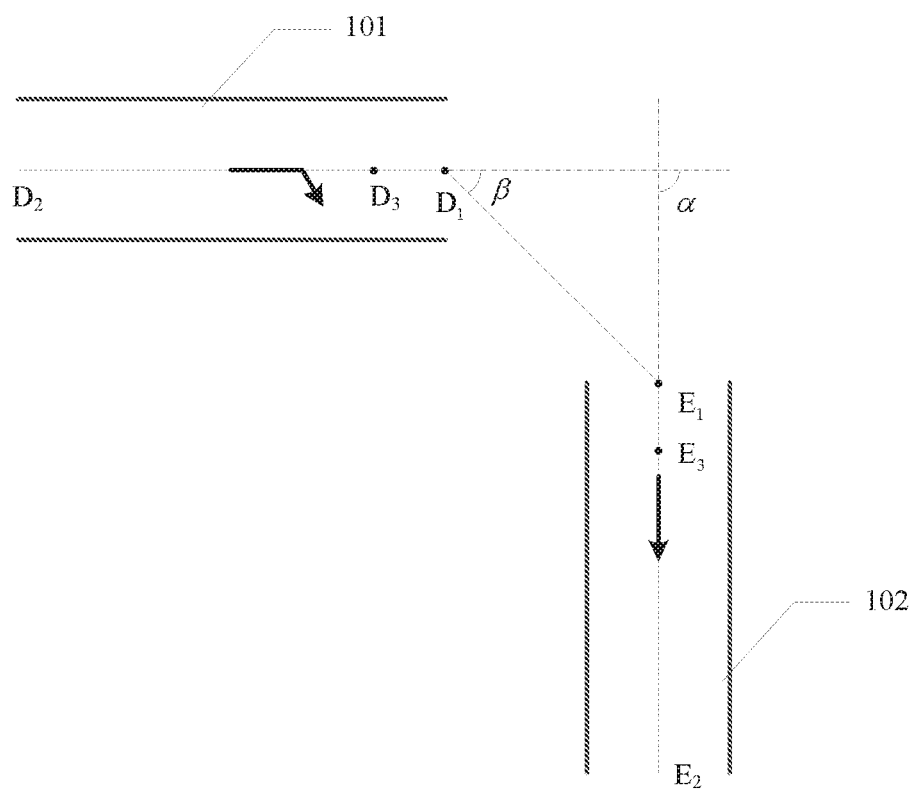
FIG. 10 is a schematic diagram of a direction rotation angle and a location included the rotation angle according to an embodiment.

FIG. 10 is a schematic diagram of an intersection. Referring to FIG. 10, at the intersection, a pull-out lane 101 and a pull-in lane 102 are shown. $D_1$ is a first endpoint, the first endpoint being an endpoint of a lane center line $D_1D_2$ of the pull-out lane 101 at the intersection. $D_3$ is located on the lane center line $D_1D_2$ of the pull-out lane 101. $E_1$ is a second endpoint, the second endpoint being an endpoint of a lane center line $E_1E_2$ of the pull-in lane 102 at the intersection. $E_3$ is located on the lane center line $E_1E_2$ of the pull-in lane 102. A direction rotation angle $\alpha$ is an angle between $\overline{D_3D_1}$ and $\overline{E_1E_3}$, and a location included angle $\beta$ is an angle between $\overline{D_3D_1}$ and $\overline{D_1E_1}$.

An ideal direction rotation angle $\alpha_0$ and an ideal location included angle $\beta_0$ may be preset values determined in advance according to a pull-out attribute. The ideal direction rotation angle $\alpha_0$ and the ideal location included angle $\beta_0$ are directional. In an embodiment, a clockwise direction is negative, a counter-clockwise direction is positive, and the angle unit is in degrees (°). For example, corresponding values of the ideal direction rotation angle $\alpha_0$, the ideal location included angle $\beta_0$, and the pull-out attribute are shown in the following Table 1:

TABLE 1

| Pull-out attribute | Ideal direction rotation angle $\alpha_0$ | Ideal location included angle $\beta_0$ |
|---|---|---|
| Turning right | −90° | −45° |
| Turning left | 90° | 45° |
| Going straight | 0° | 0° |
| Making a U-turn | 180° | 90° |

In step 801b2, the server may determine that, if the direction rotation angle deviation and the location included angle deviation that correspond to the pull-in lane satisfy a preset condition, the pull-in lane may have the communication attribute relative to the pull-out lane.

In some embodiments, a matching coefficient corresponding to the pull-in lane may be calculated according to the direction rotation angle deviation and the location included angle deviation that correspond to the pull-in lane. If the matching coefficient corresponding to the pull-in lane satisfies the preset condition, it may be determined that the pull-in lane has the communication attribute relative to the pull-out lane.

For example, the matching coefficient corresponding to the pull-in lane may be calculated by using the following formula:

$$\eta = |\alpha - \alpha_0| + |\beta - \beta_0| - \lambda,$$

where $\eta$ indicates the matching coefficient corresponding to the pull-in lane, $|\alpha - \alpha_0|$ indicates the direction rotation angle deviation, the direction rotation angle deviation being an absolute value of a difference between the direction rotation angle $\alpha$ and the ideal direction rotation angle $\alpha_0$. $|\beta - \beta_0|$ indicates the location included angle deviation, the location included angle deviation being an absolute value of a difference between the location included angle $\beta$ and the ideal location included angle $\beta_0$. $\lambda$ is a preset threshold. A value of the preset threshold $\lambda$ may be obtained according to experimental data. For example, the value of the preset threshold $\lambda$ may range from 30° to 67.5°.

In some embodiments, the preset condition may be that the matching coefficient $\eta$ is less than 0. For example, when the matching coefficient corresponding to the pull-in lane $\eta$ is −5°, it may be determined that the pull-in lane has the communication attribute relative to the pull-out lane.

In some embodiments, when the matching coefficient corresponding to each pull-in lane is not less than 0, it may be determined that a pull-in lane having a minimum matching coefficient has the communication attribute relative to the pull-out lane. For example, the pull-out lane may correspond to a first pull-in lane and a second pull-in lane, where if a matching coefficient corresponding to the first pull-in lane is 2°, and a matching coefficient corresponding to the second pull-in lane is 50, it may be determined that the first pull-in lane has the communication attribute relative to the pull-out lane.

In step 802, the server may determine, for each combination of a pull-out lane and a pull-in lane and according to a first endpoint of a lane center line of the pull-out lane at the intersection and a second endpoint of a lane center line of the pull-in lane at the intersection, a travelling path connecting the first endpoint to the second endpoint.

In another embodiment, a straight line connecting the first endpoint to the second endpoint may be used as a travelling path.

In another embodiment, a curve connecting the first endpoint to the second endpoint may be used as a travelling path.

For example, a travelling path connecting the first endpoint to the second endpoint may be determined by constructing a Bezier curve. The step 802 may further include the following substeps.

In step 802*a*, the server may determine control points of a second Bezier curve.

The control points of the second Bezier curve may include Q0, Q1, Q2 and Q3. Q0 may coincide with the first endpoint $D_1$, Q3 may coincide with the second endpoint $E_1$, a coordinate of Q1 may be $$Q_1 = D_1 + k_2(D_1 - D_3)\frac{|D_1 E_1|}{|D_1 D_3|},$$

and a coordinate of Q2 may be $$Q_2 = E_1 + k_2(E_1 - E_3)\frac{|D_1 E_1|}{|E_1 E_3|}.$$

$D_3$ may be located on the lane center line $D_1 D_2$ of the pull-out lane. For example, $D_3$ is a sampling point close to D1 and being on the lane center line $D_1 D_2$ of the pull-out lane. $E_3$ is located on the lane center line $E_1 E_2$ of the pull-in lane. For example, $E_3$ is a sampling point close to $E_1$ and being on the lane center line $E_1 E_2$ of the pull-in lane. $|D_1 E_1|$ indicates the length of the line segment $D_1 E_1$, $|D_1 D_3|$ indicates the length of the line segment $D_1 D_3$, $|E_1 E_3|$ indicates the length of the line segment $E_1 E_3$, and $k_2$ is a preset constant. A value of $k_2$ may be obtained according to practical experience. For example, the value of $k_2$ may range from 0.2 to 0.7.

In step 802*b*, the server may determine sampling points on the second Bezier curve according to the control points of the second Bezier curve.

A coordinate Fj of a jth sampling point on the second Bezier curve is:

$$F_j = Q_0 u^3 + 3Q_1 u^2(1-u) + 3Q_2 u(1-u)^2 + Q_3(1-u)^3,$$

where $$u = \frac{j-1}{m-1},$$

m indicates a quantity of the sampling points on the second Bezier curve, m is an integer greater than 1, 1≤j≤m and j is an integer.

In step 802*c*, the server may sequentially connect the sampling points on the second Bezier curve to obtain the second Bezier curve and use the second Bezier curve as the travelling path connecting the first endpoint to the second endpoint.

FIG. 11 is a schematic diagram of determining a travelling path in a manner of constructing a Bezier curve. A lane center line of a pull-out lane 101 is D1D2, and a first endpoint is D1, and D3 is a sampling point close to D1. A lane center line of a pull-in lane 102 is E1E2, and a second endpoint is E1, and E3 is a sampling point close to E1. For example, assuming that a control point Q0 coincides with D1, and a control point Q3 coincides with E1, it may be ensured that lane center lines of the travelling path and a lane connected to the travelling path are smooth and continuous. A control point Q1 is located on an extension line of D3D1, and a control point Q2 is located on an extension line of E3E1. After four control points of the second Bezier curve are determined, a cubic formula for a Bezier curve introduced in step 802*b* may be used. The coordinates of sampling points on the second Bezier curve may be calculated, and then the sampling points may be connected to obtain the second Bezier curve that is shown by using a curve Q0Q3 in FIG. 11. The curve Q0Q3 is the travelling path connecting the first endpoint to the second endpoint.

The travelling path connecting the first endpoint to the second endpoint may be determined in a manner of constructing a Bezier curve, so that a curvature of a joint between the travelling path and the lane center line connected to the travelling path is smooth and continuous, thereby better satisfying an actual travelling requirement and facilitating a supporting function of the determined travelling path for advanced driver assistance and unmanned driving.

According to this embodiment, a travelling path connecting the first endpoint to the second endpoint may be determined by constructing a Bezier curve. In another embodiment, the travelling path may be further determined by constructing a spline curve, and a curvature continuity objective may be similarly achieved.

Accordingly, after a lane center line of each lane is determined, a pull-out lane and a pull-in lane are respectively determined according to a pull-out attribute, and then the lane center line of the pull-out lane is connected to the lane center line of the pull-in lane to implement completeness of connection of the lane center lines within a road topology.

According to an embodiment, an apparatus may be used to execute the method described herein.

FIG. 12A is a flowchart of a lane center line determining method according to an embodiment. The method may be performed by a server configured to provide a navigation service to user equipment. As shown in FIG. 12A, the method may include the following operations.

In step S1201, a server may receive location information sent by user equipment and may obtain navigation data of a road segment corresponding to the location information from a database. The navigation data may include information of a lane center line of a target lane in the road segment and a quantity of lanes in the road segment being changed, the target lane being an added or subtracted lane, and the lane center line of the target lane in the road segment being determined by the server according to the foregoing method.

In some embodiments, after receiving the location information, the server may obtain a road segment corresponding to the location information. If the road segment is the road segment having a changed lane quantity, a lane center line of a target lane in the road segment may be determined by the server according to the method in the foregoing embodiment.

In step S1202, the server may return the navigation data of the road segment to the user equipment.

Figure 12B:
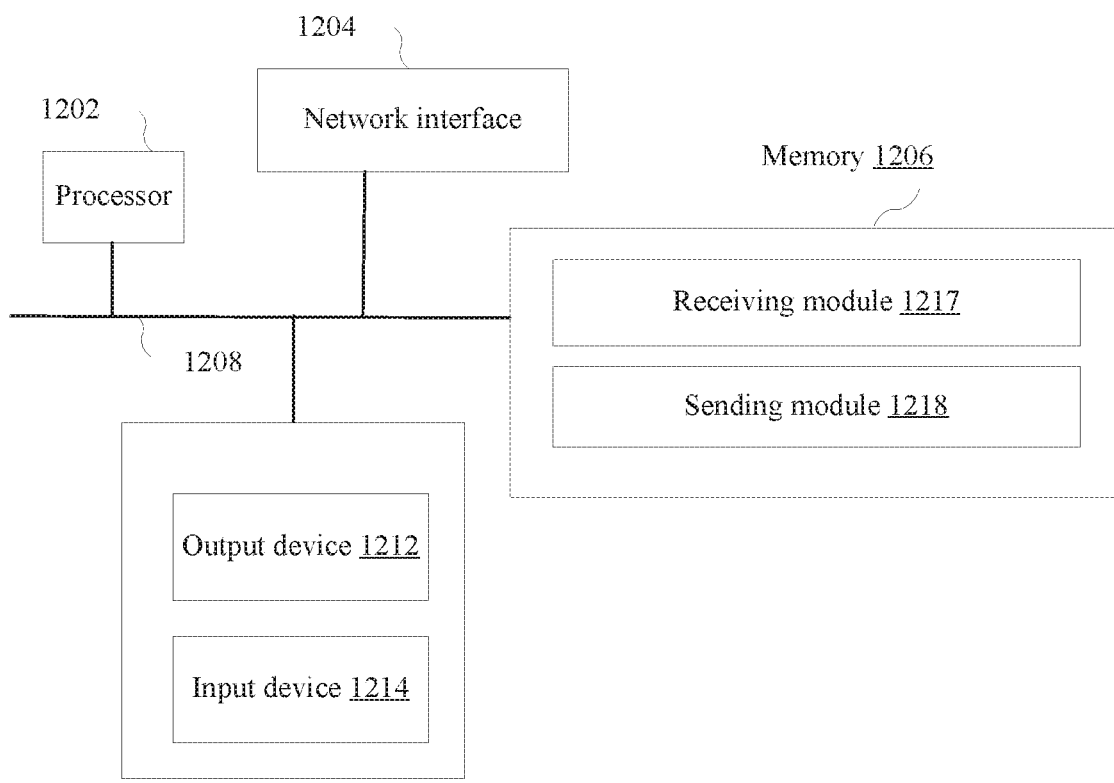
FIG. 12B is a schematic structural diagram of a server according to an embodiment.

FIG. 12B is a schematic structural diagram of a server according to an embodiment. The user equipment may be the server 112 shown in FIG. 1.

As shown in FIG. 12B, the server 1200 may include one or more processors (CPU) 1202, a network interface 1204, a memory 1206, and a communications bus 1208 configured to interconnect these components.

In some embodiments, the network interface 1204 may be configured to implement a network connection between the server 1200 and an external device. For example, the server 1200 may receive a navigation data request message of the user equipment or send navigation data to the user equipment.

The server 1200 may further include one or more output devices 1212, such as a touchscreen display, and/or include one or more input devices 1214, such as a touchscreen, a stylus, or another input control.

The memory 1206 may be a high-speed random access memory, such as a DRAM, an SRAM, a DDR RAM, or other random access solid-state memory devices, or a non-volatile memory, such as one or more magnetic disk storage devices, optical disc storage devices, flash memory devices, or other non-volatile solid-state memory devices.

The memory 1206 may include a receiving module 1217 configured to receive location information sent by user equipment and obtain navigation data corresponding to a road segment corresponding to the location information from a database according to the location information, the navigation data including information of a lane center line of a target lane in the road segment, and a quantity of lanes in the road segment being changed, the target lane being an added or subtracted lane, and the lane center line of the target lane in the road segment being determined by the server according to the foregoing method. The memory 1206 may also include a sending module 1218 configured to return the navigation data corresponding to the road segment to the user equipment.

Figure 13:
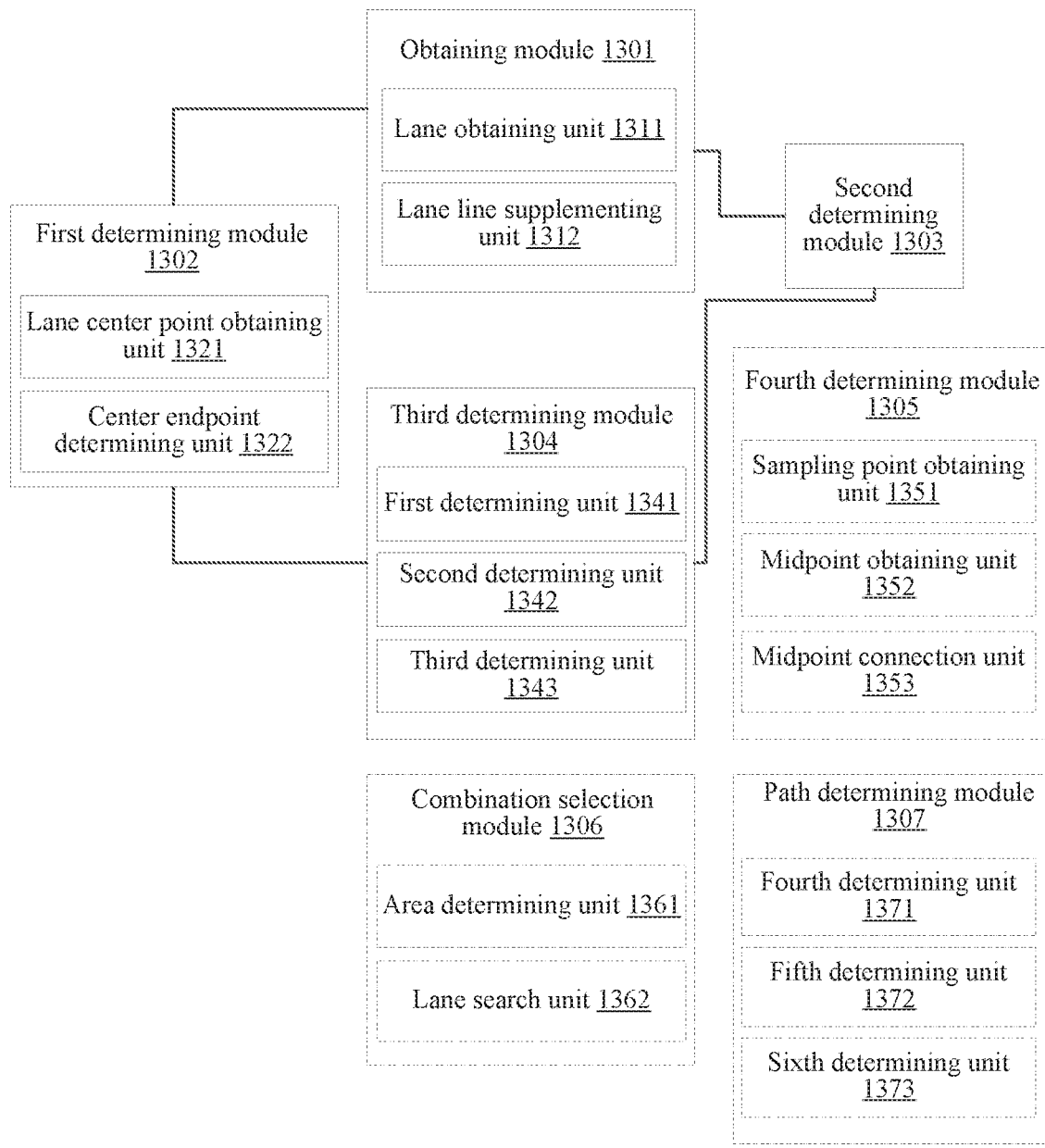
FIG. 13 is a block diagram of a lane center line determining apparatus according to an embodiment.

FIG. 13 is a block diagram of a lane center line determining apparatus according to an embodiment. The apparatus may implement functions of the foregoing methods. The functions may be implemented using hardware or software. The apparatus may include an obtaining module 1301, a first determining module 1302, a second determining module 1303 and a third determining module 1304.

The obtaining module 1301 may be configured to perform the foregoing step 201.

The first determining module 1302 may be configured to perform the foregoing step 202.

The second determining module 1303 may be configured to perform the foregoing step 203.

The third determining module 1304 may be configured to perform the foregoing steps 204 and 205.

In some embodiments, the third determining module 1304 may include a first determining unit 1341, a second determining unit 1342 and a third determining unit 1343.

The first determining unit 1341 may be configured to perform the foregoing step 204a.

The second determining unit 1342 may be configured to perform the foregoing step 204b.

The third determining unit 1343 may be configured to perform the foregoing step 204c.

In some embodiments, the first determining module 1302 may include a lane center point obtaining unit 1321 and a center endpoint determining unit 1322.

The lane center point obtaining unit 1321 may be configured to perform the foregoing step 203a.

The center endpoint determining unit 1322 may be configured to perform the foregoing steps 203b-d.

In some embodiments, the obtaining module 1301 may include a lane obtaining unit 1311 and a lane line supplementing unit 1312.

The lane obtaining unit 1311 may be configured to determine, if no lane line is absent in the first road segment, the target lane according to lane lines in the first road segment.

The lane line supplementing unit 1312 may be configured to supplement, if a lane line is absent in the first road segment, the lane line absent in the first road segment according to lane lines of two side neighboring road segments connected to the first road segment and the lane obtaining unit 1311 may be further configured to determine the target lane according to lane lines in the first road segment.

In some embodiments, the lane line supplementing unit 1312 may be specifically configured to select, for any first lane line endpoint, a second lane line endpoint at a shortest distance from the first lane line endpoint if a lane line connected to the first lane line endpoint is absent in the first road segment, and connect the first lane line endpoint to the selected second lane line endpoint to form a lane line. The first lane line endpoint may be an endpoint of a lane line in a first neighboring road segment close to the first road segment, the second lane line endpoint may be an endpoint of a lane line in a second neighboring road segment close to the first road segment, and a quantity of lanes of the first neighboring road segment may be greater than a quantity of lanes of the second neighboring road segment.

In some embodiments, the apparatus may further include a fourth determining module 1305.

The fourth determining module 1305 may be configured to use, for any non-target lane, a center line of two side lane lines of the non-target lane as a lane center line of the non-target lane. The non-target lane may include other lanes than the target lane in the first road segment and any lane in a second road segment, and the second road segment may be a road segment having an unchanged lane quantity.

In some embodiments, the fourth determining module 1305 may include a sampling point obtaining unit 1351, a midpoint obtaining unit 1352 and a midpoint connection unit 1353.

The sampling point obtaining unit 1351 may be configured to perform the foregoing step 601.

The midpoint obtaining unit 1352 may be configured to perform the foregoing step 602.

The midpoint connection unit 1353 may be configured to perform the foregoing step 603.

In some embodiments, the apparatus may further include a combination selection module 1306 and a path determining module 1307.

The combination selection module 1306 may be configured to perform the foregoing step 801.

The path determining module 1307 may be configured to perform the foregoing step 802.

In some embodiments, the combination selection module 1306 may include an area determining unit 1361 and a lane search unit 1362.

The area determining unit 1361 may be configured to perform the foregoing step 801a.

The lane search unit 1362 may be configured to perform the foregoing step 801b.

In some embodiments, the area determining unit 1361 may be specifically configured to determine, if a pull-out attribute of a pull-out lane includes turning right, that a first rectangular area $G_1H_1I_1J_1$ is a search area corresponding to the pull-out lane, where $G_1$ coincides with a first endpoint, $H_1$ is located on an extension line of a lane center line of the pull-out lane at an intersection, and $I_1J_1$ is parallel to $G_1H_1$ and is located on a side of a right turning direction of $G_1H_1$. The area determining unit may also determine, if a pull-out attribute of a pull-out lane includes turning left, that a second rectangular area $G_2H_2I_2J_2$ is a search area corresponding to the pull-out lane, where $G_2$ coincides with a first endpoint. $H_z$ is located on an extension line of a lane center line of the pull-out lane at an intersection, and $I_2J_2$ is parallel to $G_2H_2$ and is located on a side of a left turning direction of $G_2H_2$. Further, the area determining unit may determine, if a pull-out attribute of a pull-out lane includes going straight, that a third rectangular area $G_3H_3I_3J_3$ is a search area corresponding to the pull-out lane, where the first endpoint is a midpoint of $G_3H_3$, and $I_3J_3$ is parallel to $G_3H_3$ and is located on a side of a straight going direction of $G_3H_3$ or determine, if a pull-out attribute of a pull-out lane includes making a U-turn, that a fourth rectangular area $G_4H_4I_4J_4$ is the search area corresponding to the pull-out lane, where the first endpoint is a midpoint of $G_4H_4$, and $I_4J_4$ is parallel to $G_4H_4$ and is located on a side of a turning left direction of $G_4H_4$.

In some embodiments, the lane search unit 1362 may be configured to perform the foregoing steps 801*b*1 and 801*b*2.

In some embodiments, the path determining module 1307 may include a fourth determining unit 1371, a fifth determining unit 1372 and a sixth determining unit 1373.

The fourth determining unit 1371 may be configured to perform the foregoing step 802*a*.

The fifth determining unit 1372 may be configured to perform the foregoing step 802*b*.

The sixth determining unit 1373 may be configured to perform the foregoing step 802*c*.

It should be noted that, when the apparatus provided in the foregoing embodiment implements the functions of the apparatus, only division of the foregoing function modules is used as an example for description. In the practical application, the functions may be allocated to and completed by different function modules according to requirements. That is, an internal structure of the device is divided into different function modules, to complete all or some of the functions described above. In addition, the apparatus and method embodiments provided in the foregoing embodiments belong to one conception.

Figure 14:
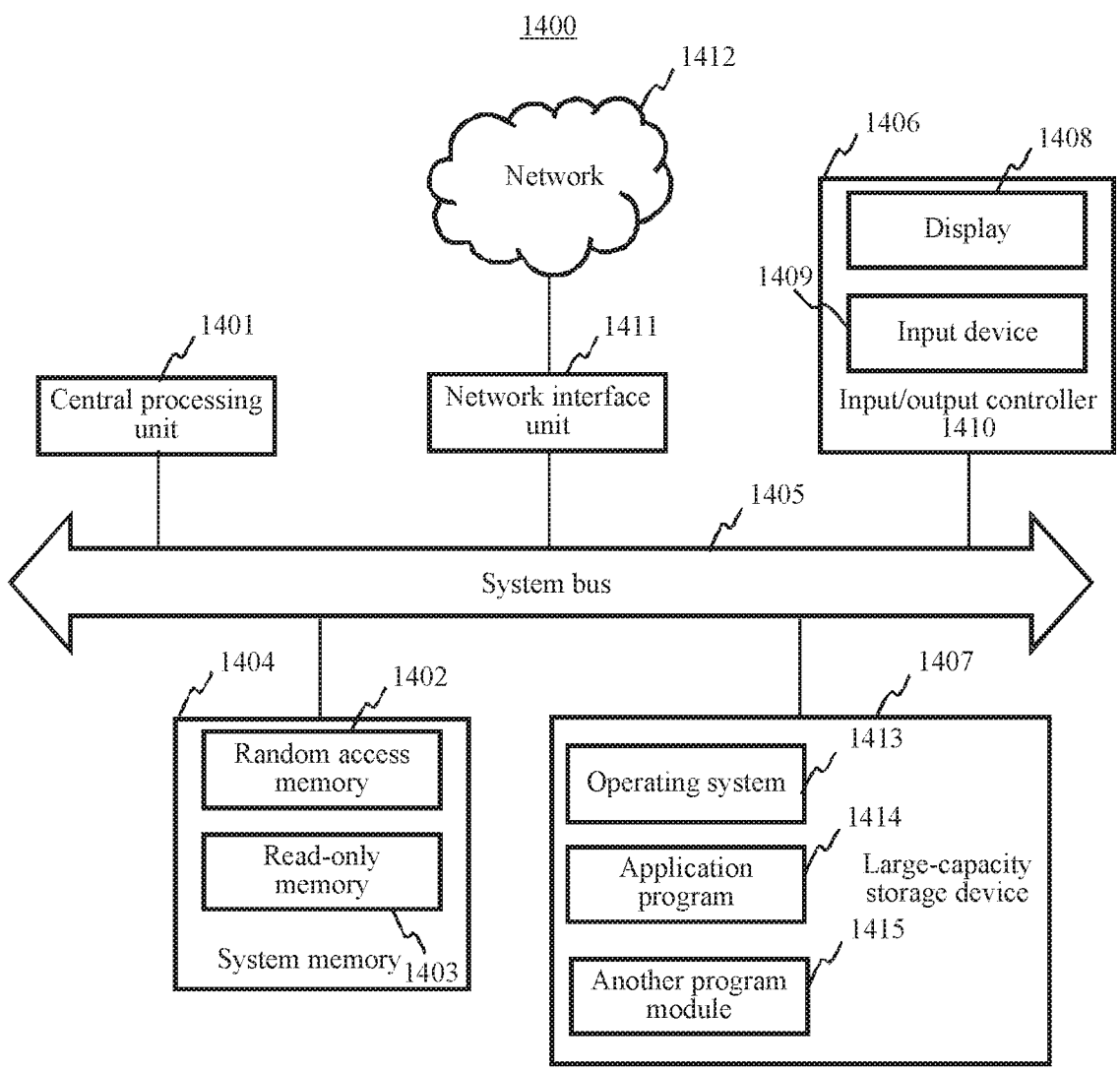
FIG. 14 is a schematic structural diagram of a server according to an embodiment.

FIG. 14 is a schematic structural diagram of a server according to an embodiment. The server may be configured to implement the lane center line determining method provided in the foregoing embodiments.

The server 1400 may include a central processing unit (CPU) 1401, a system memory 1404 including a random access memory (RAM) 1402 and a read-only memory (ROM) 1403. A system bus 1405 may connect the system memory 1404 to the CPU 1401. The server 1400 may further include a basic input/output system (I/O system) 1406 assisting in transmitting information between devices in a computer, and a large-capacity storage device 1407 configured to store an operating system 1413, an application program 1414 and another program module 1415.

The basic I/O system 1406 may include a display 1408 configured to display information and an input device 1409, such as a mouse or a keyboard, configured to receive input information from a user. The display 1408 and the input device 1409 both may be connected to the CPU 1401 through the system bus 1405. The basic I/O system 1406 may further include the input and output controller 1410 configured to receive and process inputs from multiple other devices, such as a keyboard, a mouse, and an electronic stylus. Similarly, the input and output controller 1410 further provides an output to a display screen, a printer or another type of output device.

The large-capacity storage device 1407 may be connected to the CPU 1401 by using a large-capacity storage controller connected to the system bus 1405. The large-capacity storage device 1407 and its associated computer readable medium may provide non-volatile storage for the server 1400. That is, the large-capacity storage device 1407 may include the computer readable medium, such as a hard disk or a CD-ROM driver.

The computer readable medium may include a computer storage medium and a communications medium. The computer storage medium may include volatile and non-volatile media, and removable and non-removable media implemented by using any method or technology configured to store information, such as a computer-readable instruction, a data structure, a program module, or other data. The computer storage medium may include a RAM, a ROM, an EPROM, an EEPROM, a flash memory, or other solid storage technologies, such as a CD-ROM, a DVD, a cassette, a magnetic tape, a disk storage, or other optical and magnetic storage devices. A person skilled in art would readily understand that the computer storage medium is not limited to the foregoing types. The system memory 1404 and the large-capacity storage device 1407 may be collectively referred to as a memory.

According to various embodiments, the server 1400 may further be connected, by using a network such as the Internet, to a remote computer on the network and run. That is, the server 1400 may be connected to a network 1412 by using a network interface unit 1411 connected to the system bus 1405, or may be connected to another type of network or remote computer system by using the network interface unit 1411.

The memory may further include one or more programs. The one or more programs may be stored in the memory configured to be executed by one or more processors. The one or more programs may include an instruction used for performing the methods on a server side.

In an exemplary embodiment, a non-transitory computer readable storage medium including an instruction may be further provided. For example, a memory including an instruction may be executed by a processor in a server to complete the steps on the server side in the foregoing method embodiments. For example, the non-transitory computer readable storage medium may be a ROM, a random access memory (RAM), a CD-ROM, a magnetic tape, a floppy disk, an optical data storage device, or the like.

The terms "first" the "second" and similar terms used herein do not indicate any order, quantity or significance, but are used to distinguish different components.

The sequence numbers of the foregoing embodiments are merely for description purpose and do not indicate the preference of the embodiments.

The foregoing descriptions are merely exemplary embodiments of this application, but are not intended to limit this application. Any modification, equivalent replacement, or improvement made within the principle of this application shall fall within the protection scope of this application.

What is claimed is:

1. A lane center line determining method, performed by one or more processors on a server, the method comprising:
obtaining a target lane in a first road segment among a plurality of road segments, the target lane being an added or subtracted lane, wherein two side lane lines of the target lane are respectively connected to two endpoints of a first lane of a second road segment among the plurality of road segments and intersect at an intersection point connected to a first side lane line of a second lane in a third road segment among the plurality of road segments;

obtaining target lane information, the target lane information comprising:
locations of the two endpoints at a first end of the target lane, and
a location of the intersection point at a second end of the target lane determining a first midpoint of the two endpoints at the first end of the target lane, as a first center endpoint of the first end of the target lane;

determining a second midpoint between the intersection point and a mapping point of the intersection point, as a second center point of the second end of the target lane, the mapping point of the intersection point being located at a second side lane line of the second lane in the third road segment;

determining a lane center line of the target lane by connecting the first center endpoint of the first end of the target lane and the second center endpoint of the second end of the target lane;

determining the lane center line of the target lane as a travelling path of a vehicle; and transmitting the traveling path of the vehicle to the vehicle and directing the vehicle to travel along the lane center line, wherein the first lane in the second road segment and the second lane in the third road segment are substantially parallel, and wherein the determining the lane center line of the target lane further comprises:
determining control points based on the first midpoint and the second midpoint, a line extending in parallel to the second lane in the third road segment from the first midpoint, and a line extending in parallel to the first lane in the second road segment from the second midpoint;
determining sampling points according to the control points; and
sequentially connecting the sampling point to obtain a first Bezier curve, and using the first Bezier curve as the lane center line of the target lane.

2. The method according to claim 1, wherein the obtaining the target lane in the first road segment further comprises:
based on determining that at least one lane line is absent in the first road segment, supplementing the at least one lane line absent in the first road segment according to the two endpoints of the first lane in the second road segment, and the intersection point and the mapping point in the third road segment; and
determining the target lane according to the at least one lane line in the first road segment.

3. The method according to claim 2, wherein the obtaining the target lane in the first road segment further comprises:
determining a first lane line endpoint, the first lane line endpoint being an endpoint of a first lane line of the first lane in the second road segment;
determining a second lane line endpoint, the second lane line endpoint being an endpoint of a first lane line of the second lane in the third road segment;
selecting a line that is the shortest distance between the first lane line endpoint and the second lane line endpoint, among a plurality of lines connecting the first lane line endpoint and the second lane line endpoint; and
connecting the first lane line endpoint and the second lane line endpoint, wherein
a quantity of lanes of the second road segment is greater than a quantity of lanes of the third road segment.

4. The method according to claim 1, wherein the method further comprises:
determining a non-target lane, the non-target lane being a lane other than the target lane in the first road segment or any lane in the second road segment;
using, for the non-target lane, a center line of two side lane lines of the non-target lane as a lane center line of the non-target lane.

5. The method according to claim 4, wherein the using, for the non-target lane, the center line of two side lane lines of the non-target lane as the lane center line of the non-target lane further comprises:
obtaining at least two groups of sampling points on the two side lane lines of the non-target lane, wherein each of the at least two groups of sampling points comprises a first sampling point and a second sampling point, each of the first sampling point and the second sampling point is located on one of the two lane lines of the non-target lane, and a connecting line between the first sampling point and the second sampling point is perpendicular to a travelling direction of the non-target lane;
obtaining a third midpoint between the first sampling point and the second sampling point; and
sequentially connecting midpoints between the groups of sampling points to obtain the lane center line of the non-target lane.

6. The method according to claim 1, wherein the method further comprises:
selecting a combination of a pull-out lane and a pull-in lane connected to an intersection, wherein the vehicle pulls in to the intersection from the pull-out lane and enters the pull-in lane through the intersection; and
determining, for each combination of the pull-out lane and the pull-in lane, the travelling path by connecting a first endpoint of a lane center line of the pull-out lane at the intersection and a second endpoint of a lane center line of the pull-in lane at the intersection.

7. The method according to claim 6, wherein the selecting the combination of the pull-out lane and the pull-in lane at the intersection further comprises:
determining, for each pull-out lane of the intersection, a search area according to a pull-out attribute of the pull-out lane, wherein the pull-out lane attribute comprises at least one of turning right, turning left, going straight, and making a U-turn; and
searching the search area corresponding to the pull-out lane to obtain a pull-in lane corresponding to the pull-out lane attribute of the pull-out lane.

8. The method according to claim 7, wherein the searching the search area corresponding to the pull-out lane to obtain the pull-in lane corresponding to the pull-out lane attribute of the pull-out lane further comprises:
calculating, for each pull-in lane in the search area corresponding to the pull-out lane, a direction rotation angle deviation and a location included angle deviation that correspond to the pull-in lane, wherein the direction rotation angle deviation is an absolute value of a difference between the direction rotation angle and an ideal direction rotation angle, and the location included the angle deviation is an absolute value of a difference between a location included angle and an ideal location included angle; and determining, based on the direction rotation angle deviation and the location included angle deviation that correspond to the pull-in lane satisfying a preset condition, the pull-in lane that correspond to the pull-out lane attribute of the pull-out lane.

9. The method according to claim 6, the method further comprising:

determining second control points;

determining second sampling points according to the second control points; and sequentially connecting the second sampling points to obtain a second Bezier curve, and using the second Bezier curve as the travelling path of the vehicle.

10. A lane center line determining apparatus, comprising:

at least one memory configured to store computer program code; and at least one a processor configured to access the at least one memory and operate as instructed by the computer program code, the computer program code comprising:

obtaining code configured to cause the at least one processor to:

obtain a target lane in a first road segment among a plurality of road segments, the target lane being an added or subtracted lane, wherein two side lane lines of the target lane are respectively connected to two endpoints of a first lane of a second road segment among the plurality of road segments and intersect at an intersection point connected to a first side lane line of a second lane in a third road segment among the plurality of road segments; and obtain target lane information of the target lane, the target lane information comprising:

locations of the two endpoints at a first end of the target lane, and a location of the intersection point at a second end of the target lane, first determining code configured to cause the at least one processor to determine a first midpoint of the two endpoints at the first end of the target lane, as a first center endpoint of the first end of the target lane;

second determining code configured to cause the at least one processor to determine a second midpoint between the intersection point and a mapping point of the intersection point, as a second center point of the second end of the target lane, the mapping point of the intersection point being located at a second side lane line of the second lane in the third road segment;

third determining code configured to cause the at least one processor to determine a lane center line of the target lane by connecting the first center endpoint of the first end of the target lane and the second center endpoint of the second end of the target lane;

path determining code configured to cause the at least one processor to determine the lane center line of the target lane as a travelling path of a vehicle; and sending code configured to cause the at least one processor to transmit the traveling path of the vehicle to the vehicle and direct the vehicle to travel along the lane center line, wherein the first lane in the second road segment and the second lane in the third road segment are substantially parallel, and wherein the third determining code is further configured to cause the at least one processor to:

determine control points based on the first midpoint and the second midpoint, and a line extending in parallel to the second lane in the third road segment from the first midpoint, and a line extending in parallel to the first lane in the second road segment from the second midpoint;

determine sampling points according to the control points; and sequentially connect the sampling point to obtain a first Bezier curve, and using the first Bezier curve as the lane center line of the target lane.

11. The apparatus according to claim 10, wherein the obtaining code is further configured to cause the at least one processor to:

based on determining that at least one lane line is absent in the first road segment, supplement the at least one lane line absent in the first road segment according to the two endpoints of the first lane in the second road segment, and the intersection point and the mapping point in the third road segment; and determine the target lane according to the at least one lane line in the first road segment.

12. The apparatus according to claim 11, wherein the obtaining code is further configured to cause the at least one processor to:

determine a first lane line endpoint, the first lane line endpoint being an endpoint of a first lane line of the first lane in the second road segment;

determine a second lane line endpoint, the second lane line endpoint being an endpoint of a first lane line of the second lane in the third road segment;

select a line that is the shortest distance between the first lane line endpoint and the second lane line endpoint among a plurality of lines connecting the first lane line endpoint and the second lane line endpoint; and connect the first lane line endpoint and the second lane line endpoint, wherein a quantity of lanes of the second road segment is greater than a quantity of lanes of the third road segment.

13. The apparatus according to claim 10, further comprising:

fourth determining code configured to cause the at least one processor to:

determine a non-target lane, the non-target lane being a lane other than the target lane in the first road segment or any lane in the second road segment; and use, for the non-target lane, a center line of two side lane lines of the non-target lane as a lane center line of the non-target lane.

14. The apparatus according to claim 10, further comprising:

combination selection code configured to cause the at least one processor to select a combination of a pull-out lane and a pull-in lane connected to an intersection, wherein the vehicle pulls in to the intersection from the pull-out lane and enters the pull-in lane through the intersection, and wherein the path determining code is further configured to cause the at least one processor to determine, for each combination of the pull-out lane and the pull-in lane, the travelling path by connecting a first endpoint of a lane center line of the pull-out lane at the intersection and a second endpoint of a lane center line of the pull-in lane at the intersection.

15. The apparatus according to claim 14, wherein the combination selection code further comprises:

area determining code configured to cause the at least one processor to determine, for each pull-out lane of the intersection, a search area according to a pull-out attribute of the pull-out lane, wherein the pull-out lane attribute comprises at least one of turning right, turning left, going straight, and making a U-turn; and lane search code configured to cause the at least one processor to search the search area corresponding to the pull-out lane to obtain a pull-in lane corresponding to the pull-out lane attribute of the pull-out lane.

16. The apparatus according to claim 14, wherein the path determining code further comprises:

fourth determining code configured to cause the at least one processor to determine second control points;

fifth determining code configured to cause the at least one processor to determine second sampling points according to the second control points; and sixth determining code configured to cause the at least one processor to sequentially connect the second sampling points to obtain a second Bezier curve, and use the second Bezier curve as the travelling path of the vehicle.

17. A non-transitory computer readable storage medium, storing computer program code, the computer program code, when executed by at least one processor, the at least one processor is configured to:

obtain a target lane in a first road segment among a plurality of road segments, the target lane being an added or subtracted lane, wherein two side lane lines of the target lane are respectively connected to two endpoints of a first lane of a second road segment among the plurality of road segments and intersect at an intersection point connected to a first side lane line of a second lane in a third road segment among the plurality of road segments;

obtain target lane information, the target lane information comprising:

locations of the two endpoints at a first end of the target lane, and a location of the intersection point at a second end of the target lane determine a first midpoint of the two endpoints at the first end of the target lane, as a first center endpoint of the first end of the target lane;

determine a second midpoint between the intersection point and a mapping point of the intersection point, as a second center point of the second end of the target lane, the mapping point of the intersection point being located at a second side lane line of the second lane in the third road segment;

determine a lane center line of the target lane by connecting the first center endpoint of the first end of the target lane and the second center endpoint of the second end of the target lane;

determine the lane center line of the target lane as a travelling path of a vehicle; and transmit the traveling path of the vehicle to the vehicle and direct the vehicle to travel along the lane center line, wherein the first lane in the second road segment and the second lane in the third road segment are substantially parallel, and wherein the at least one processor is further configured to:

determine control points based on the first midpoint and the second midpoint, and a line extending in parallel to the second lane in the third road segment from the first midpoint, and a line extending in parallel to the first lane in the second road segment from the second midpoint;

determine sampling points according to the control points; and sequentially connect the sampling point to obtain a first Bezier curve, and using the first Bezier curve as the lane center line of the target lane.

* * * * *